United States Patent
Ochiai

(10) Patent No.: US 9,186,954 B2
(45) Date of Patent: Nov. 17, 2015

(54) BLOWER UNIT

(75) Inventor: Toshinori Ochiai, Obu (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 859 days.

(21) Appl. No.: 13/363,577

(22) Filed: Feb. 1, 2012

(65) Prior Publication Data

US 2012/0207593 A1 Aug. 16, 2012

(30) Foreign Application Priority Data

Feb. 14, 2011 (JP) ................... 2011-28468

(51) Int. Cl.
| | |
|---|---|
| F04D 25/16 | (2006.01) |
| B60H 1/00 | (2006.01) |
| F04D 29/28 | (2006.01) |
| F04D 29/42 | (2006.01) |

(52) U.S. Cl.
CPC .......... *B60H 1/00471* (2013.01); *F04D 25/166* (2013.01); *F04D 29/281* (2013.01); *F04D 29/424* (2013.01); *B60H 2001/00085* (2013.01)

(58) Field of Classification Search
CPC ... F04D 25/082; F04D 25/166; F04D 29/424; F04D 29/4246; F04D 17/162; F04D 17/164; F04D 29/281; B60H 1/00471; B60H 2001/00085
USPC ..................... 415/97–99, 101, 102, 204, 206; 454/156–157, 160, 121; 417/366, 371, 417/423.5
See application file for complete search history.

(56) References Cited

U.S. PATENT DOCUMENTS

| | | | | |
|---|---|---|---|---|
| 7,699,587 | B2* | 4/2010 | Chapman et al. ............. | 417/370 |
| 2008/0253879 | A1* | 10/2008 | Kang et al. ..................... | 415/98 |
| 2009/0208327 | A1* | 8/2009 | Ito et al. ........................ | 415/143 |
| 2010/0035534 | A1* | 2/2010 | Kajiya .......................... | 454/141 |

FOREIGN PATENT DOCUMENTS

| | | |
|---|---|---|
| JP | 11-115450 | 4/1999 |
| JP | 11-115451 | 4/1999 |
| JP | 2000-255243 | 9/2000 |

OTHER PUBLICATIONS

Office Action issued Jan. 28, 2014 in corresponding JP Application No. 2011-028468 (with English translation).

* cited by examiner

*Primary Examiner* — Edward Look
*Assistant Examiner* — Danielle M Christensen
(74) *Attorney, Agent, or Firm* — Harness, Dickey & Pierce, P.L.C.

(57) ABSTRACT

A blower unit has a scroll casing having a first intake port and a second intake port; a first fan drawing air flowing from the first intake port; a second fan coaxially arranged with the first fan and drawing air flowing from the second intake port; a fan motor having a main body and a rotation shaft driven by the main body; and a blower cover arranged to face and cover one of the first intake port and the second intake port. The fan motor is fixed to the blower cover at a position facing the one of the first intake port and the second intake port.

13 Claims, 5 Drawing Sheets

BLOWER UNIT

CROSS REFERENCE TO RELATED APPLICATION

This application is based on Japanese Patent Application No. 2011-28468 filed on Feb. 14, 2011, the disclosure of which is incorporated herein by reference in its entirety.

TECHNICAL FIELD

The present invention relates to a blower unit.

BACKGROUND

JP-A-11-115451 or JP-A-2000-255243 discloses an air-conditioner for a vehicle having a blower unit. The blower unit has a two-layer construction that is able to intake an inside air inside of a passenger compartment of the vehicle and an outside air outside of the passenger compartment dividedly.

The blower unit is described with reference to FIGS. 4 and 5.

As shown in FIG. 4, a conventional blower unit 100 has a blower casing 101, a scroll casing 102, a centrifugal fan 103 and a fan motor 104. The blower casing 101 defines an outer shape of the blower unit 100. The scroll casing 102 has a first intake port 102a and a second intake port 102b for drawing the inside air and the outside air, and defines a first air passage 105 and a second air passage 106 for the air so as to send the air to the passenger compartment. The fan 103 has a first fan 103a and a second fan 103b accommodated in the scroll casing 102. The fan motor 104 drives the fan 103.

The scroll casing 102 has a separator 102c for partitioning the first air passage 105 and the second air passage 106 from each other.

The first fan 103a is arranged in the first passage 105, and draws air from the first intake port 102a defined on an axial end of the fan 103. The second fan 103b is arranged in the second passage 106, and draws air from the second intake port 102b defined on the other axial end of the fan 103. The first fan 103a and the second fan 103b are arranged on the same axis, and are connected to a rotation shaft 104a of the fan motor 104 so as to rotate integrally with the rotation shaft 104a.

The fan motor 104 is a drive source that drives to rotate the shaft 104a, and is fixed to the scroll casing 102. Specifically, as shown in FIG. 5, the fan motor 104 has plural (three in FIG. 5) mount stays 104b extending in a radial direction of the fan motor 104. The fan motor 104 is mounted to an outer periphery of the second intake port 102b through the stays 104b.

However, when the fan motor 104 is fixed to the scroll casing 102, a part of the second intake port 102b is closed by the stays 104b, so that air ventilation resistance is increased in the air passage 106. Thereby, the amount of the air sent to the passenger compartment may be decreased, and the noise may be increased.

Even in a case where the fan motor 104 is arranged adjacent to the first fan 103a and where the stay 104b is mounted to the outer periphery of the first intake port 102a, the stay 104b causes an increase in the air ventilation resistance of the air passage 105.

SUMMARY OF THE DISCLOSURE

In view of the foregoing and other problems, it is an object of the present invention to provide a blower unit in which an air ventilation resistance is reduced.

According to an example of the present invention, a blower unit having a two-layer construction that is able to intake an outside air out of a passenger compartment of a vehicle and an inside air in the passenger compartment dividedly includes a scroll casing, a centrifugal first fan, a centrifugal second fan, a fan motor and a blower cover. The scroll casing has a first intake port and a second intake port that intake at least one of the outside air and the inside air, and defines a first air passage through which the air taken from the first intake port passes and a second air passage through which the air taken from the second intake port passes. The centrifugal first fan is arranged in the first air passage so as to draw the air flowing from the first intake port. The centrifugal second fan is coaxially arranged with the first fan, and is arranged in the second air passage so as to draw the air flowing from the second intake port. The fan motor has a main body and a rotation shaft driven by the main body. A first end of the rotation shaft is connected to each of the first fan and the second fan, and a second end of the rotation shaft is connected to the motor body. The blower cover is arranged to face and cover one of the first intake port and the second intake port. The fan motor is fixed to the blower cover at a position facing the one of the first intake port and the second intake port.

Accordingly, an air ventilation resistance is reduced in the blower unit.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

First Embodiment

An air-conditioner that includes a blower unit 1 according to a first embodiment will be described. The air-conditioner is mounted to a vehicle. The vehicle has a dash panel (not shown) between a passenger compartment and an engine compartment, and an instrument panel (not shown) at the most front part in the passenger compartment. The air-conditioner has an indoor unit arranged in a space defined between the dash panel and the instrument panel.

Figure 1:
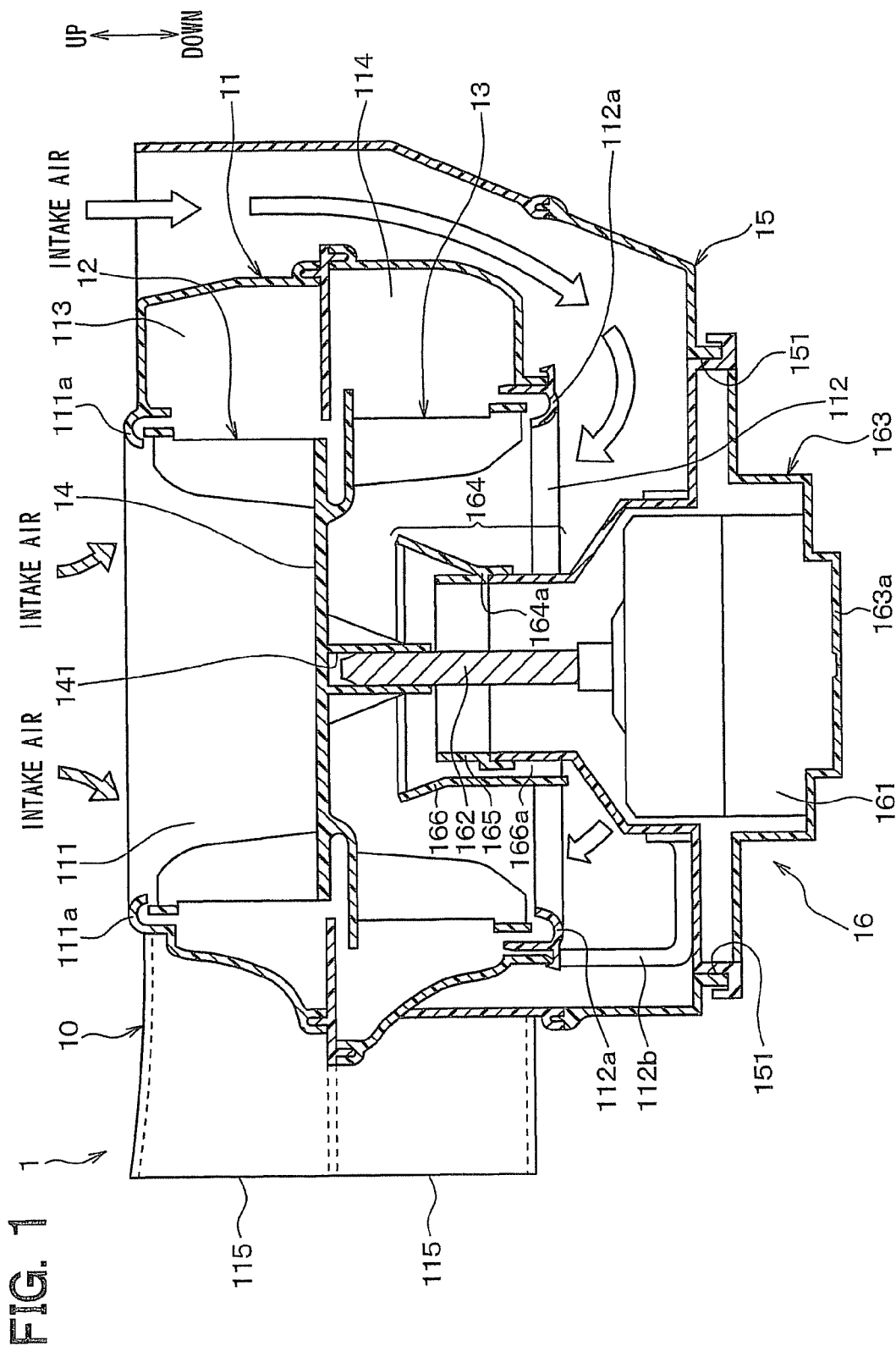
FIG. 1 is a schematic cross-sectional view illustrating a blower unit according to a first embodiment.

The indoor unit has the blower unit 1 shown in FIG. 1 and an air-conditioning unit (not shown). The blower unit 1 sends air into the passenger compartment, and the air-conditioning unit controls the temperature of the air sent by the blower unit 1.

The blower unit 1 is located at an approximately center section of the vehicle, and the air-conditioning unit is arranged to the side (passenger seat side) of the blower unit 1. Alternatively, the blower unit 1 and the air-conditioning unit may be arranged at the approximately center section of the vehicle, and the blower unit 1 may be arranged at the front side of the air-conditioning unit.

The air-conditioning unit has an air-conditioning casing made of resin and defining an air passage through the air flows from the blower unit 1. The blower unit 1 has a scroll casing 11, and the scroll casing 11 has an air outlet opening 115 at the scroll end. The air-conditioning casing is connected to the air outlet opening 115. The air passage is separated into an upper part and a lower part by a separator.

An evaporator is arranged in the air-conditioning casing at a position most adjacent to the air outlet opening 115, and cools air sent from the blower unit 1. The evaporator is a heat exchanger for cooling the air by absorbing heat from the air using evaporative latent heat of refrigerant in a refrigerating cycle. The evaporator is arranged to cross the whole area of the upper part and the lower part of the air passage in the air-conditioning casing.

A heater core is arranged downstream of the evaporator, and reheats the air cooled by the evaporator. The heater core is arranged astride the upper part and the lower part of the air passage in the air-conditioning casing.

An air mix door is arranged between the evaporator and the heater core, and controls the temperature of air to be blown into the passenger compartment by changing a ratio of an amount of air passing through the heater core to an amount of air bypassing the heater core.

A most downstream part of the air-conditioning casing in the air flowing direction has plural openings such as face opening, foot opening and defroster opening which communicate with face outlet, foot outlet and defroster outlet, respectively, through which air conditioned in the air-conditioning case is blown into the passenger compartment. That is, the conditioned air is blown into the passenger compartment through the plural openings of the air-conditioning casing.

The blower unit 1 will be described with reference to FIG. 1. Up and down directions in FIG. 1 are defined in a state that the blower unit 1 is mounted on the vehicle.

The blower unit 1 has a two-layer structure, and air outside of the passenger compartment (outside air) and air inside of the passenger compartment (inside air) are drawn in a separated state (dividedly).

The blower unit 1 has a switch box (not shown) which introduces the outside air and the inside air, and a blower 10. The blower 10 draws the outside air and the inside air in the separated state through the switch box, and sends the air toward the air-conditioning unit.

The switch box has a casing, and a first inlet and a second inlet are defined at the upper part of the casing. One of the inlets is an outside air port introducing the outside air into the casing, and the other inlet is an inside air port introducing the inside air into the casing.

Inside of the casing of the switch box is divided into a first passage and a second passage by a separating board. The air introduced from the first inlet passes through the first passage, and the air introduced from the second inlet passes through the second passage. A filter (not shown) which removes dust contained in the air is arranged in each passage.

Each passage has a door which opens/closes the outside/inside air port. A rotation shaft of the door is connected to a servo motor, and the door is opened/closed by a driving force of the servo motor. The servo motor is controlled by a control signal output from an air-conditioning controller (not shown).

The scroll casing 11 of the blower 10 has a first inlet 111 and a second inlet 112. One of the outside air and the inside air introduced from the first inlet of the switch box is drawn into the casing 11 through the first inlet 111. One of the outside air and the inside air introduced from the second inlet of the switch box is drawn into the casing 11 through the second inlet 112.

The first inlet 111 opens to the upper side of the vehicle in FIG. 1, and has a guide part 111*a* having bell-like cross-section on the periphery of the first inlet 111. The second inlet 112 opens to the lower side of the vehicle, and has a guide part 112*a* having bell-like cross-section on the periphery of the second inlet 112. The guide part 112*a* is fixed to a motor accommodator 163 of a fan motor 16 through a mounting leg 112*b*.

The scroll casing 11 has a first air passage 113 and a second air passage 114. The first air passage 113 has a scroll shape, and the air drawn from the first inlet 111 flows through the first passage 113. The second air passage 114 has a scroll shape, and the air drawn from the second inlet 112 flows through the second passage 114. The scroll end of the casing 11 has the opening 115 from which the air is blown out of the casing 11 toward the air-conditioning unit.

A first fan 12 is arranged in the first passage 113, and draws air from the first inlet 111. A second fan 13 is arranged in the second passage 114, and draws air from the second inlet 112.

The fan 12, 13 is a centrifugal-type fan such as sirocco fan or turbo fan. Air is drawn into the casing 11 in an axis direction, and is sent out of the casing 11 outward in a radial direction. The fan 12, 13 is a one-side fan that draws air from one axial end in the axis direction.

The fans 12, 13 are coaxially arranged, and are connected to each other by a disk-shaped fan main board 14. The first fan 12 has a first axial end opposing to the first inlet 111, and a second axial end opposite from the first axial end. The second fan 13 has a first axial end opposing to the second inlet 112 and a second axial end opposite from the first axial end. The second axial ends of the fans 12, 13 are connected with each other by the board 14.

The main board 14 has a boss 141 at the center part, and the boss 141 projects toward the second fan 13. An end portion of a rotation shaft 162 of the fan motor 16 is integrally connected to the boss 141 by being fitted into the boss 141.

The second inlet 112 is covered by a blower covering 15. In other words, the blower covering 15 is arranged to cover the second inlet 112.

The blower covering 15 is connected with the scroll casing 11. An introduction passage is defined between an inner wall face of the blower covering 15 and an outer wall face of the scroll casing 11, and introduces air from the second inlet of the switch box toward the second inlet 112.

The blower covering 15 has an opening 151 at a position opposing to the second inlet 112. The fan motor 16 is attached to the opening 151 of the blower covering 15. The opening 151 has a shape fitting with the motor accommodator 163 that accommodates a main part 161 of the fan motor 16, and is closed by the motor accommodator 163.

The fan motor 16 has the rotation shaft 162 and the main part 161. An end of the shaft 162 is connected to the first fan 12 through the board 14, and the second fan 13. The main part 161 is connected to the other end of the shaft 162, and drives to rotate the shaft 162. The shaft 162 of the fan motor 16 projects from one side of the main part 161. The main part 161 includes a rotor (not shown) and a stator core (not shown).

The fan motor 16 is a DC motor or AC motor. The main part 161 may have an outer or inner rotor type internal construction.

The main part 161 of the motor 16 is accommodated in the motor accommodator 163 in a state that the main part 161 is fixed to a bottom face 163*a* of the accommodator 163 made of resin. The main part 161 is fixed to the blower covering 15 when the motor accommodator 163 is fitted to the opening 151 of the blower covering 15. That is, the main part 161 of this embodiment is fixed to the blower covering 15 through the motor accommodator 163.

Figure 4:
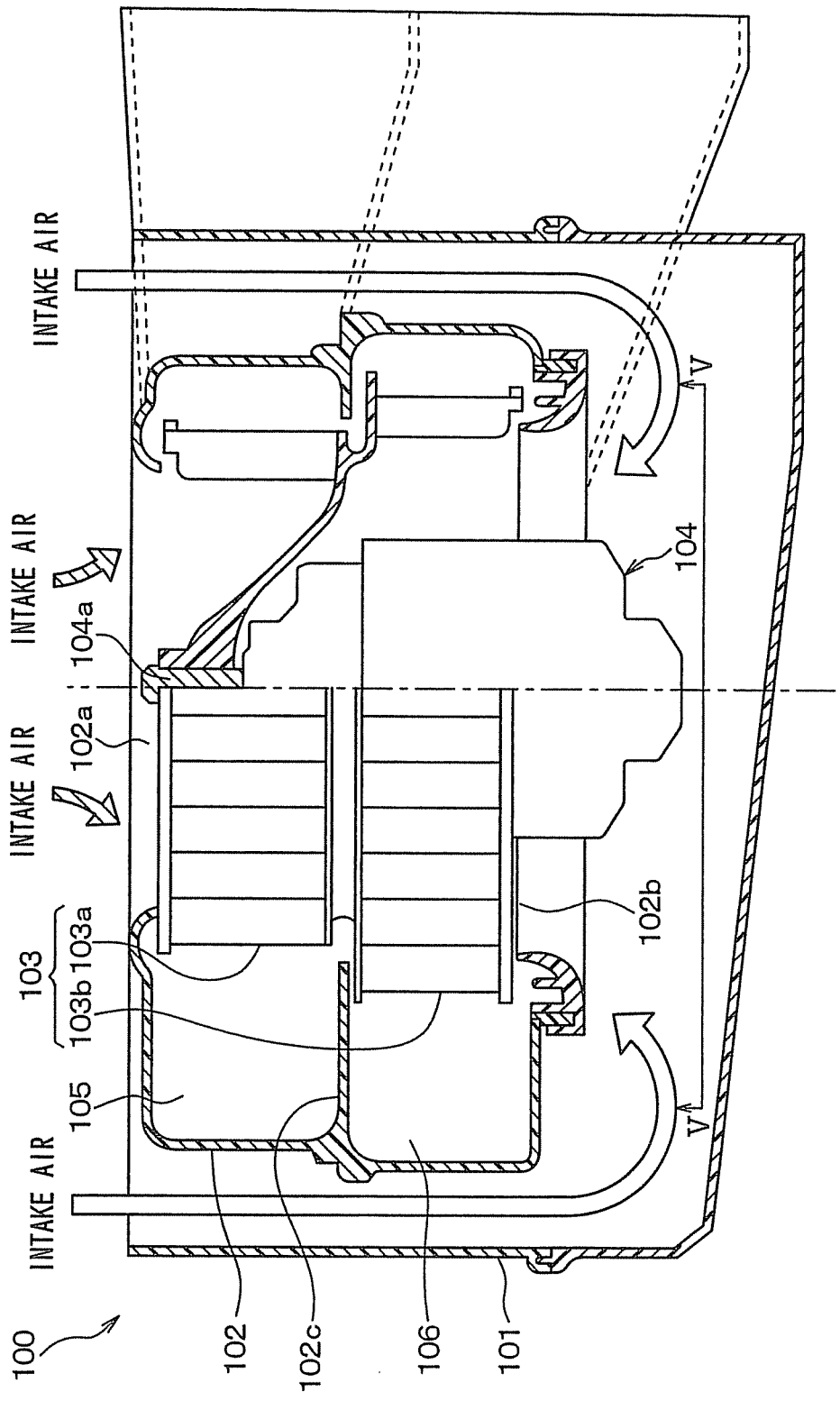
FIG. 4 is a schematic cross-sectional view illustrating a conventional blower unit.
Figure 5:
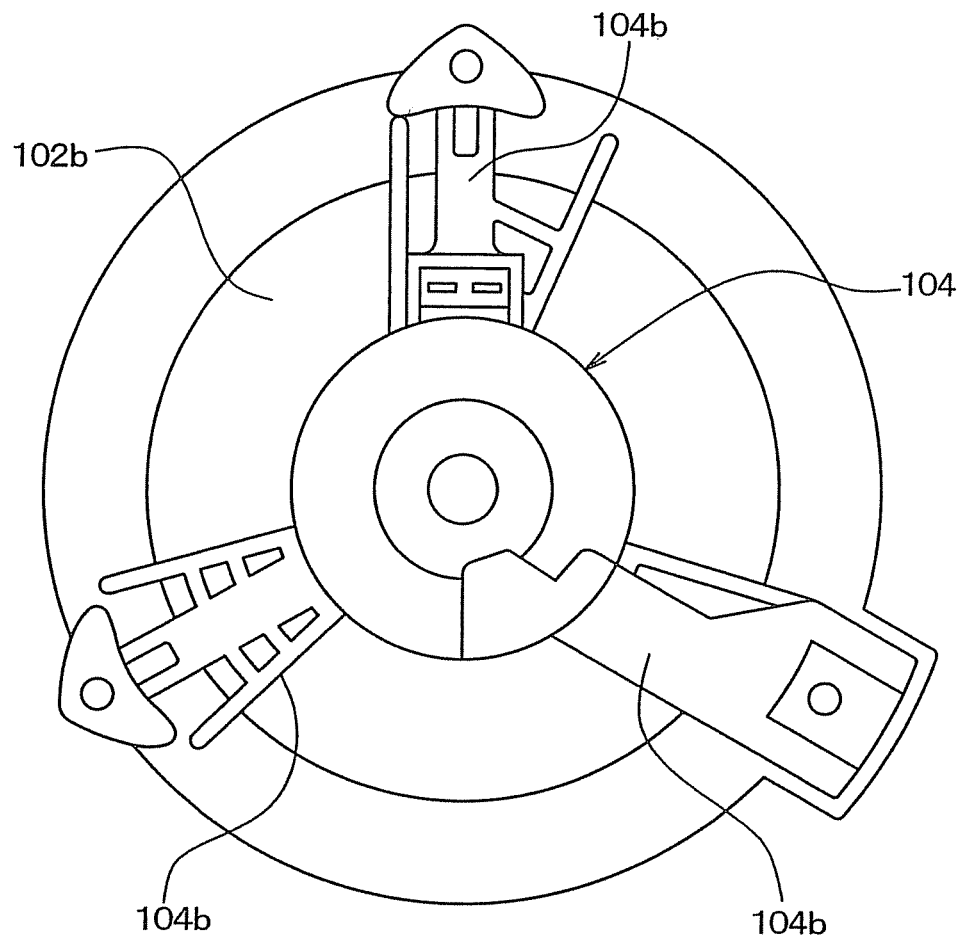
FIG. 5 is a bottom view seen from a section V-V of FIG. 4.

In a conventional comparison example shown in FIGS. 4 and 5, a main part of a motor is fixed to a periphery of a second inlet 102b of a housing through a mount stay 104b.

In the present embodiment, the motor accommodator 163 and the blower covering 15 may be fitted with each other through a water prevention packing.

If the main part 161 of the motor 16 is arranged on the inner side of the second inlet 112 in the scroll casing 11, the main part 161 causes an increase in the air ventilation resistance.

For this reason, according to the first embodiment, the main part 161 of the motor 16 is arranged outside of the second inlet 112 of the scroll casing 11. That is, the main part 161 of the motor 16 is arranged at a position not overlapping with the scroll casing 11 in the radial direction of the shaft 162, which is perpendicular to the axis direction.

The shaft 162 of the fan motor 16 is fitted to the boss 141 of the board 14, and is connected to the first fan 12 through the board 14 and the second fan 13. The shaft 162 of this embodiment is arranged inside of the second fan 12, and is located on the inner side of the second inlet 112 in the scroll casing 11. That is, the shaft 162 is located at a position overlapping with the scroll casing 11 in the radial direction.

Further, the fan motor 16 has a cylindrical member 164 inside of the second fan 13, on the inner side of the second inlet 112 of the scroll casing 11. The cylindrical member 164 extends in the axis direction from the side of the main part 161 to the side of the board 14 so as to cover the shaft 162.

An axial end of the cylindrical member 164 opposing to the main part 161 is integrally connected to the motor accommodator 163. The cylindrical member 164 is a flow control component which straightens the air drawn by the second fan 13, and is a water preventing component which prevents water from entering the motor accommodator 163.

The other axial end of the cylindrical member 164 opposing to the board 14 is branched at a branch part 164a into an internal part 165 surrounding the outer periphery of the shaft 162 and an external part 166 surrounding the outer periphery of the internal part 165. Each of the internal part 165 and the external part 166 extends from the branch part 164a in the axis direction.

A diameter of the cylindrical internal part 165 is uniform between the side of the main part 161 and the side of the board 14. A diameter of the cylindrical external part 166 is increased from the side of the main part 161 to the side of the board 14, so that the diameter of the external part 166 is increased outward in the radial direction as extending from the branch part 164a. That is, the external part 166 has a tapered shape.

A clearance 166a is defined between the internal part 165 and the external part 166 at a part of the branch part 164a. The clearance 166a works as a wastewater passage which discharges water between the internal part 165 and the external part 166 to outside of the cylindrical member 164. A drain hose (not shown) is connected to the clearance 166a, and the water is discharged out of the blower unit 1 through the drain hose. As illustrated in FIG. 1, a space or a passage portion is defined between cylindrical member 164 and shaft 162 is connected to or in communication with inlet 112. The passage portion is larger than clearance 166a defined between internal part 165 and external part 166. Boss 141 and internal part 165 do not overlap with each other in the direction of the rotational axis of shaft 162. Cylindrical member 164 acts as a guide to guide the air flow from inlet 112.

An operation of the blower unit 1 will be described hereinafter.

When the door of the switch box opens the inside air port (when the inside air mode is selected), the inside air is drawn from the first inlet 111 and the second 112 by the first fan 12 and the second fan 13 of the blower 10 of the blower unit 1. The drawn inside air is sent into the air-conditioning unit through the air passage 113, 114 of the scroll casing 11.

When the door of the switch box opens the outside air port (when the outside air mode is selected), the outside air is drawn from the first inlet 111 and the second inlet 112 by the first fan 12 and the second fan 13 of the blower 10 of the blower unit 1. The drawn outside air is sent into the air-conditioning unit through the air passage 113, 114 of the scroll casing 11.

When the door of the switch box opens the inside air port and the outside air port (when two-layer mode is selected so that both of the inside air and the outside air are drawn), the inside air is drawn from the first inlet 111 by the first fan 12 of the blower 10, and the outside air is drawn from the second inlet 112 by the second fan 13 of the blower 10.

The drawn inside air is sent into the air-conditioning unit through the air passage 113 of the scroll casing 11, and the drawn outside air is sent into the air-conditioning unit through the air passage 114 of the scroll casing 11.

According to the blower unit 1 of the present embodiment, the fan motor 16 is fixed to the blower covering 15 arranged to cover the second inlet 112, so that it is not necessary to provide a fix component such as mount stay 104b (refer to FIGS. 4 and 5) which is used for fixing the fan motor to the periphery of the second inlet 112. For this reason, even if any mode is set among the inside air mode, the outside air mode, and the two-layer mode, the air drawn from the second inlet 112 is sent into the air-conditioning unit through the second air passage 114 in the scroll casing 11 without increasing the air ventilation resistance that is caused by the fix component.

Therefore, according to the present embodiment, the air ventilation resistance can be reduced in the blower unit 1. As a result, the amount of air sent into the passenger compartment can be maintained as much, and the noise generated by the air sending can be reduced.

Moreover, the main part 161 of the fan motor 16 is arranged at the position not overlapping with the scroll casing 11 in the radial direction of the shaft 162, outside of the second fan 13. The main part 161 is restricted from becoming the ventilation resistance for the air drawn by the second fan 13. Thereby, the air ventilation resistance can be sufficiently reduced in the blower unit 1.

Moreover, the cylindrical member 164 which covers the shaft 162 of the fan motor 16 is arranged inside of the second fan 13. Therefore, a turbulent flow can be restricted from being generated around the shaft 162, and the flow of air drawn into the second inlet 112 can be rectified.

Moreover, the outer periphery of the shaft 162 located inside of the second fan 13 is covered by the cylindrical member 164, so that water is restricted from adhering to the shaft 162. Thus, the main part 161 of the fan motor 16 can be restricted from receiving water.

Moreover, the tip end of the cylindrical member 164 is branched between the cylindrical internal part 165 and the cylindrical external part 166. Even if water enters the scroll casing 11, the water can be received between the internal part 165 and the external part 166, so that the water can be restricted from entering inside of the cylindrical member 164. As a result, the main part 161 of the fan motor 16 can be effectively restricted from receiving water. In addition, the water between the internal part 165 and the external part 166 is discharged out of the cylindrical member 164 through the clearance 166a.

Second Embodiment

A second embodiment will be described with reference to FIG. 2.

The shape of the cylindrical member 164 of the fan motor 16 is modified in the second embodiment, relative to the first embodiment.

Figure 2:
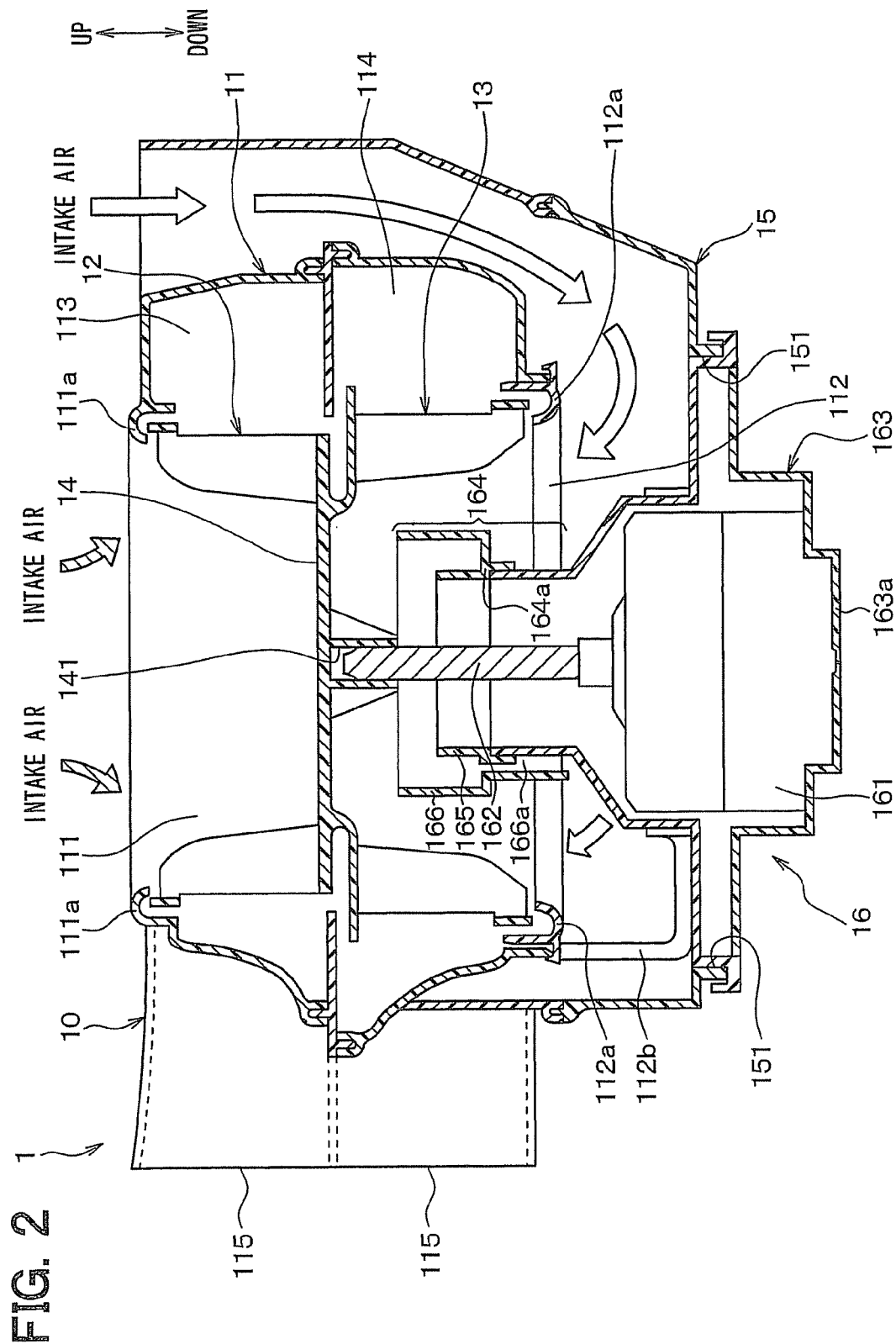
FIG. 2 is a schematic cross-sectional view illustrating a blower unit according to a second embodiment.

As shown in FIG. 2, the diameter of the external part 166 is made constant between the side of the main part 161 and the side of the board 14, similarly to the internal part 165.

The same advantages can be obtained in the second embodiment as the first embodiment.

Further, the internal part 165 may have a tapered shape in a manner that the diameter of the internal part 165 is decreased from the side of the main part 161 to the side of the board 14.

Alternatively, while the internal part 165 has the tapered shape, the external part 166 may have a tapered shape in a manner that the diameter of the external part 166 is increased from the side of the main part 161 to the side of the board 14.

Third Embodiment

Figure 3:
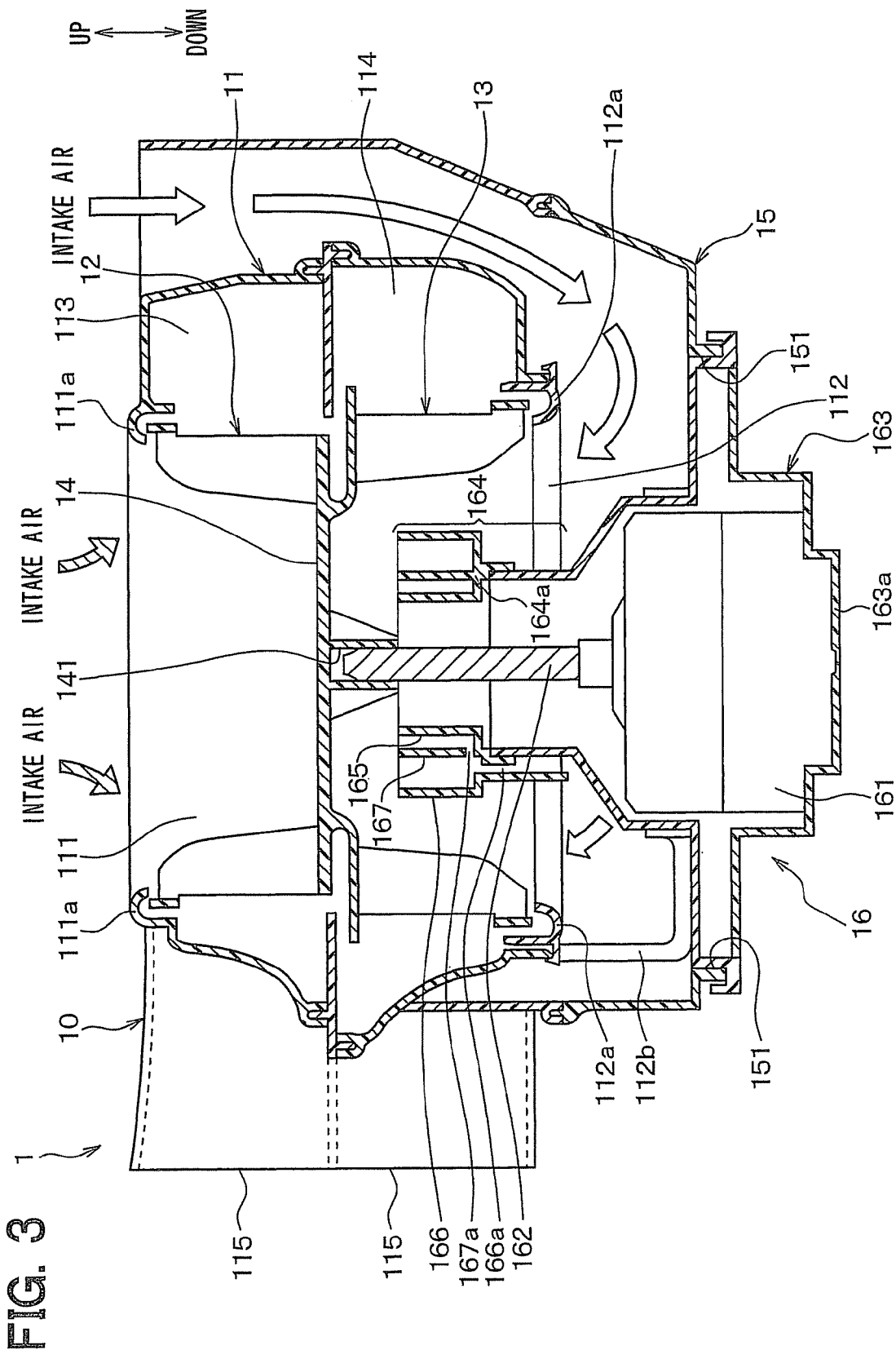
FIG. 3 is a schematic cross-sectional view illustrating a blower unit according to a third embodiment.

A third embodiment will be described with reference to FIG. 3.

A tip end of the cylindrical member 164 opposing to the board 14 is branched into an internal part 165, a middle part 167 and an external part 166. The cylindrical internal part 165 surrounds the periphery of the shaft 162. The cylindrical middle part 167 surrounds the periphery of the internal part 165. The cylindrical external part 166 surrounds the periphery of the middle part 167.

Each of the internal part 165, the middle part 167 and the external part 166 extends from the branch part 164a toward the end of the shaft 162 opposing to the main part 161. The respective diameter of the internal part 165, the middle part 167 and the external part 166 is made constant between the side of the main part 161 and the side of the board 14.

The middle part 167 has a gap 167a separated from the internal part 165 at a part of the branch part 164a at which the middle part 167 is branched from the internal part 165. The external part 166 has a gap 166a separated from the middle part 167 at a part of the branch part 164a at which the external part 166 is branched from the middle part 167.

The gap 166a, 167a works as a wastewater passage which discharges water between the internal part 165 and the middle part 167 or between the middle part 167 and the external pipe part 166 to outside of the cylindrical member 164.

The same advantages can be obtained in the third embodiment as the first and second embodiments.

At least one of the internal part 165 and the external part 166 may have a tapered shape. Further, the tip end of the cylindrical member 164 may be branched into four or more parts.

Other Embodiments

The present invention is not limited to the above embodiments.

If a size of the main part 161 of the motor 16 is small, or if the opening area of the second inlet 112 is large, the main part 161 may be located at a position overlapping with the scroll casing 11 in the radial direction of the shaft 162.

The cylindrical member 164 may be eliminated if the fan motor 16 seldom receives water.

The blower covering 15 may be located to cover the first inlet 111. At this time, the fan motor 16 may be fixed to the covering 15 at a position opposing to the first inlet 111.

Such changes and modifications are to be understood as being within the scope of the present invention as defined by the appended claims.

What is claimed is:

1. A blower unit having a two-layer construction that is able to intake an outside air out of a passenger compartment of a vehicle and an inside air in the passenger compartment dividedly, the blower unit comprising:
    a scroll casing having a first intake port and a second intake port that intake at least one of the outside air and the inside air, the scroll casing defining a first air passage through which the air taken from the first intake port passes and a second air passage through which the air taken from the second intake port passes;
    a centrifugal first fan arranged in the first air passage so as to draw the air flowing from the first intake port;
    a centrifugal second fan coaxially arranged with the first fan, the second fan being arranged in the second air passage so as to draw the air flowing from the second intake port;
    a fan motor having a main body and a rotation shaft driven by the main body, a first end of the rotation shaft being connected to each of the first fan and the second fan, a second end of the rotation shaft being connected to the main body;
    a boss part to which the rotation shaft is fitted;
    a cylindrical member arranged on an inner side of the one of the first intake port and the second intake port of the scroll casing, the cylindrical member extending in a direction of a rotational axis of the rotation shaft so as to cover the rotation shaft; and
    a blower cover arranged to face and cover one of the first intake port and the second intake port, wherein
    the fan motor is fixed to the blower cover at a position facing the one of the first intake port and the second intake port;
    the cylindrical member has a first axial end that is located adjacent to the first end of the rotation shaft,
    the first axial end is branched at a branch part to at least an internal cylindrical part and an external cylindrical part that surrounds the internal cylindrical part, and
    the internal cylindrical part and the external cylindrical part extend from the branch part in the direction of the rotational axis of the rotation shaft.

2. The blower unit according to claim 1, wherein
    the main body of the fan motor is arranged at a position unable to overlap with the scroll casing in a direction perpendicular to the rotational axis of the rotation shaft.

3. The blower unit according to claim 1, wherein
    a clearance is defined between the external cylindrical part and the internal cylindrical part at a part of the branch part.

4. The blower unit according to claim 1, wherein
    the cylindrical member has a second axial end that is located adjacent to the second end of the rotation shaft,
    the fan motor has a motor accommodator that accommodates the main body, and
    the second axial end is integrally connected to the motor accommodator.

5. The blower unit according to claim 1, wherein
    the external cylindrical part has a diameter that increases outward in a radial direction as extending from the branch part.

6. The blower unit according to claim 1, wherein
a passage portion is defined between the cylindrical member and the rotation shaft, and the passage portion is connected to the one of the first intake port and the second intake port.

7. The blower unit according to claim 1, wherein
a passage portion is defined between the cylindrical member and the rotation shaft.

8. The blower unit according to claim 1, wherein
the boss part and the internal cylindrical part do not overlap with each other in the direction of the rotational axis of the rotation shaft.

9. The blower unit according to claim 1, wherein
the first end of the rotation shaft is fitted to the boss part; and
the cylindrical member extends between the first end and the second end of the rotation shaft to cover the rotation shaft between the boss part and the main body of the fan motor.

10. The blower unit according to claim 1, wherein the cylindrical member guides air flow from the one of the first intake port and the second intake port.

11. The blower unit according to claim 1, wherein the one of the first intake port and the second intake port is spaced from the main body of the fan motor in the direction along the rotational axis of the rotation shaft of the fan motor.

12. The blower unit according to claim 1, wherein the one of the first intake port and the second intake port is disposed between the first end and the second end of the rotation shaft.

13. A blower unit having a two-layer construction that is able to intake an outside air out of a passenger compartment of a vehicle and an inside air in the passenger compartment dividedly, the blower unit comprising:
   a scroll casing having a first intake port and a second intake port that intake at least one of the outside air and the inside air, the scroll casing defining a first air passage through which the air taken from the first intake port passes and a second air passage through which the air taken from the second intake port passes;
   a centrifugal first fan arranged in the first air passage so as to draw the air flowing from the first intake port;
   a centrifugal second fan coaxially arranged with the first fan, the second fan being arranged in the second air passage so as to draw the air flowing from the second intake port;
   a fan motor having a main body and a rotation shaft driven by the main body, a first end of the rotation shaft being connected to each of the first fan and the second fan, a second end of the rotation shaft being connected to the main body;
   a boss part to which the rotation shaft is fitted;
   a cylindrical member arranged on an inner side of one of the first intake port and the second intake port of the scroll casing, the cylindrical member extending in a direction of a rotational axis of the rotation shaft so as to cover the rotation shaft; and
   a blower cover arranged to face and cover one of the first intake port and the second intake port, wherein
the fan motor is fixed to the blower cover at a position facing the one of the first intake port and the second intake port;
   a clearance is defined between the external cylindrical part and the internal cylindrical part at a part of the branch part; and
   a passage portion is defined between the cylindrical member and the rotation shaft, and the passage portion is larger than the clearance defined between the external cylindrical part and the internal cylindrical part.

* * * * *